United States Patent Office 3,096,039
Patented July 2, 1963

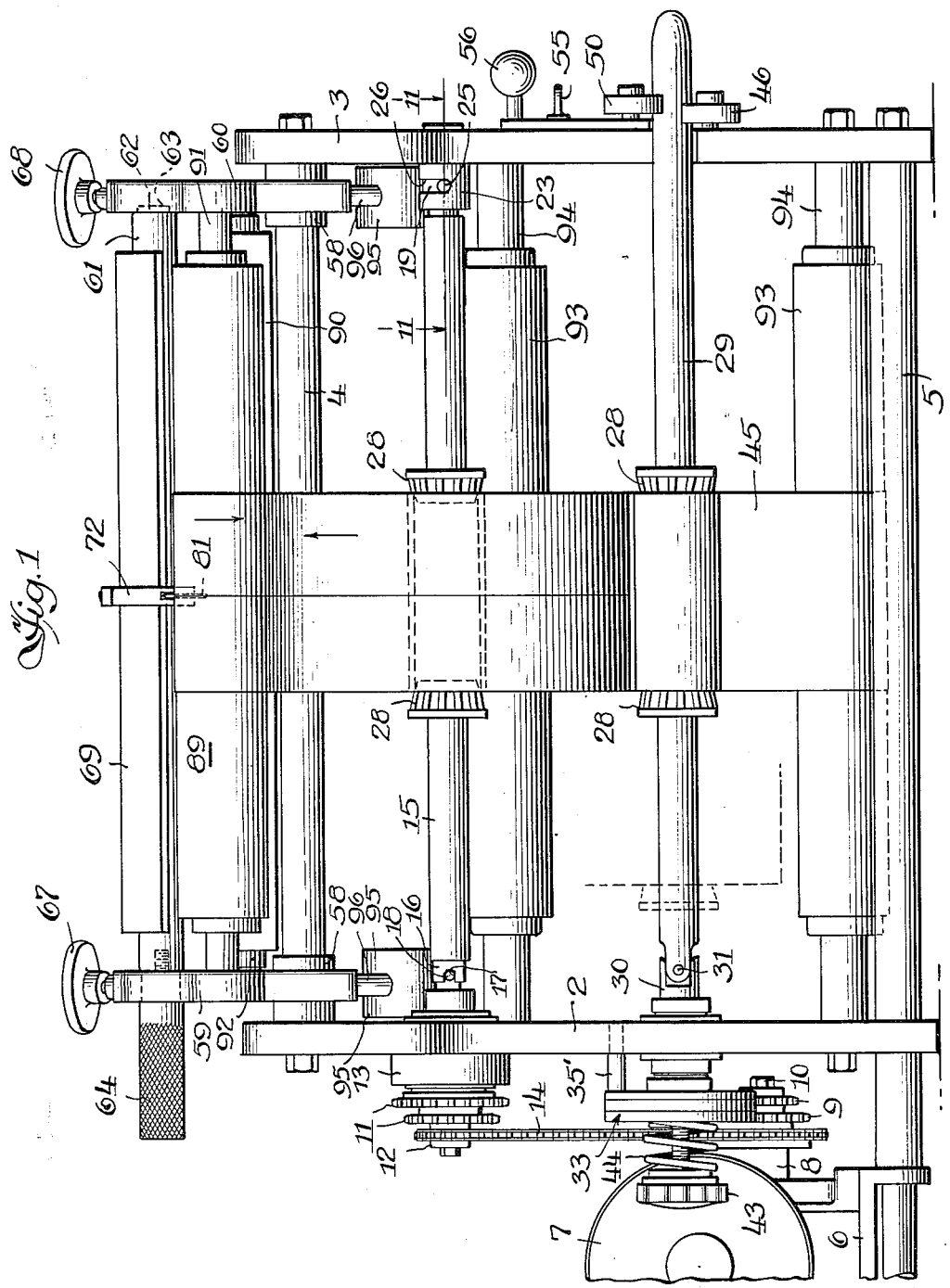

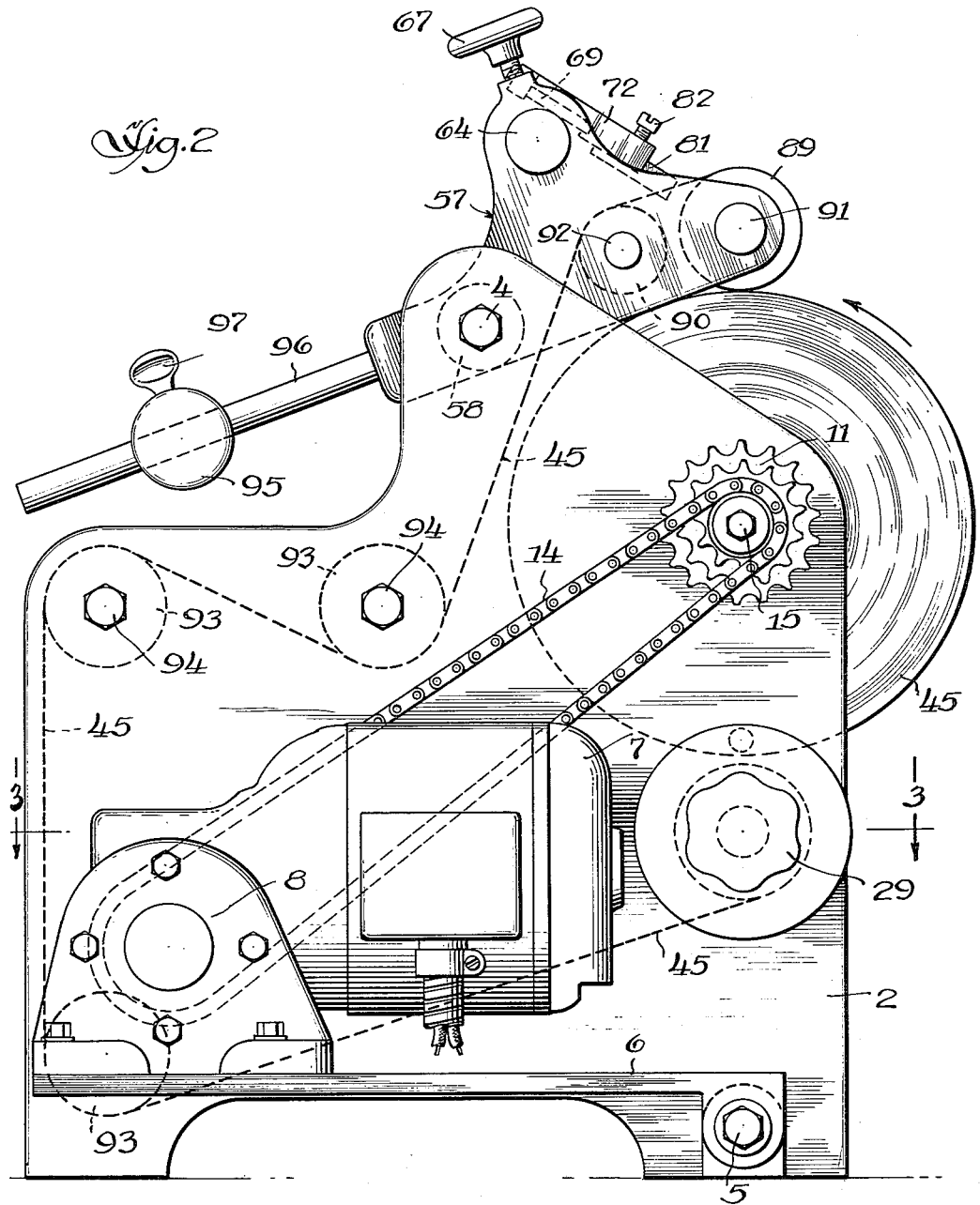

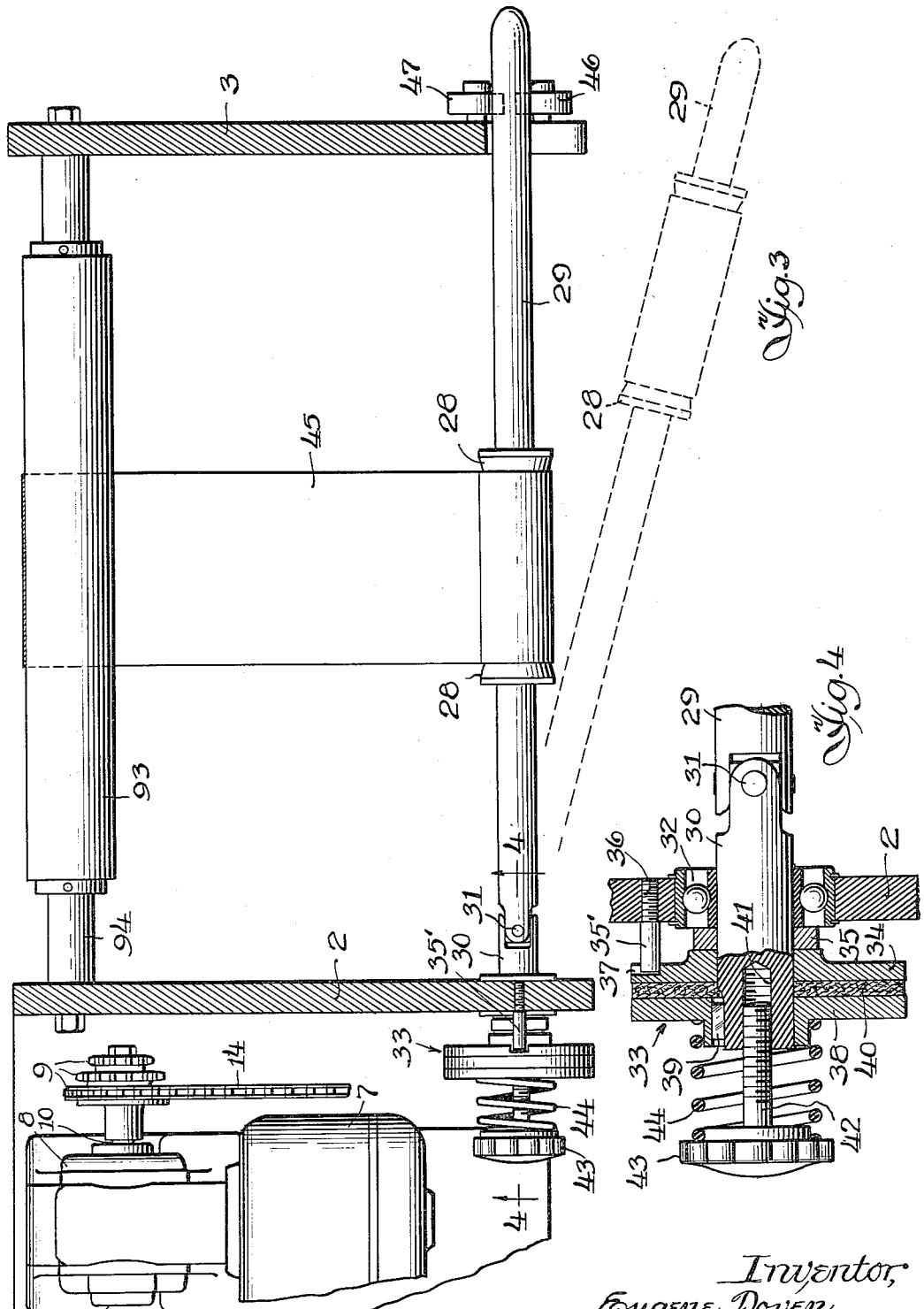

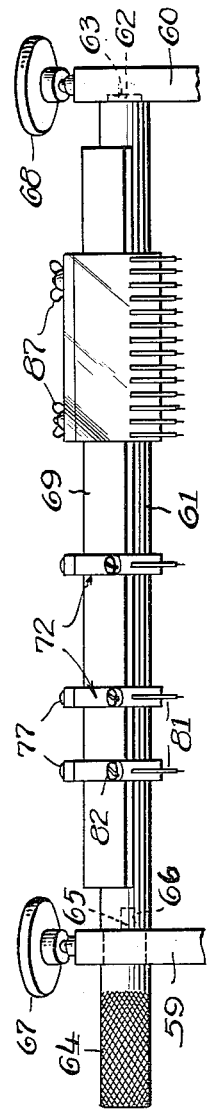

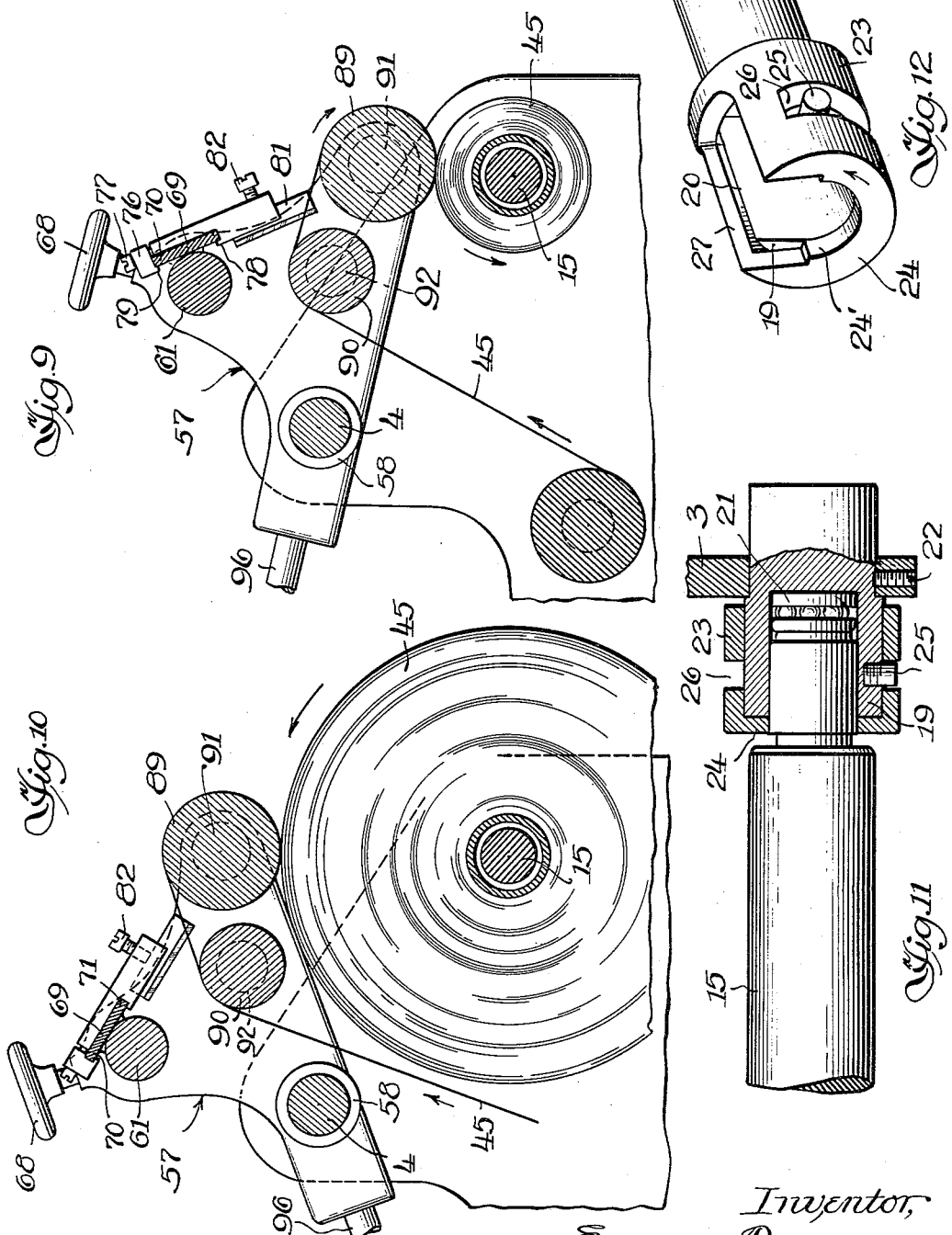

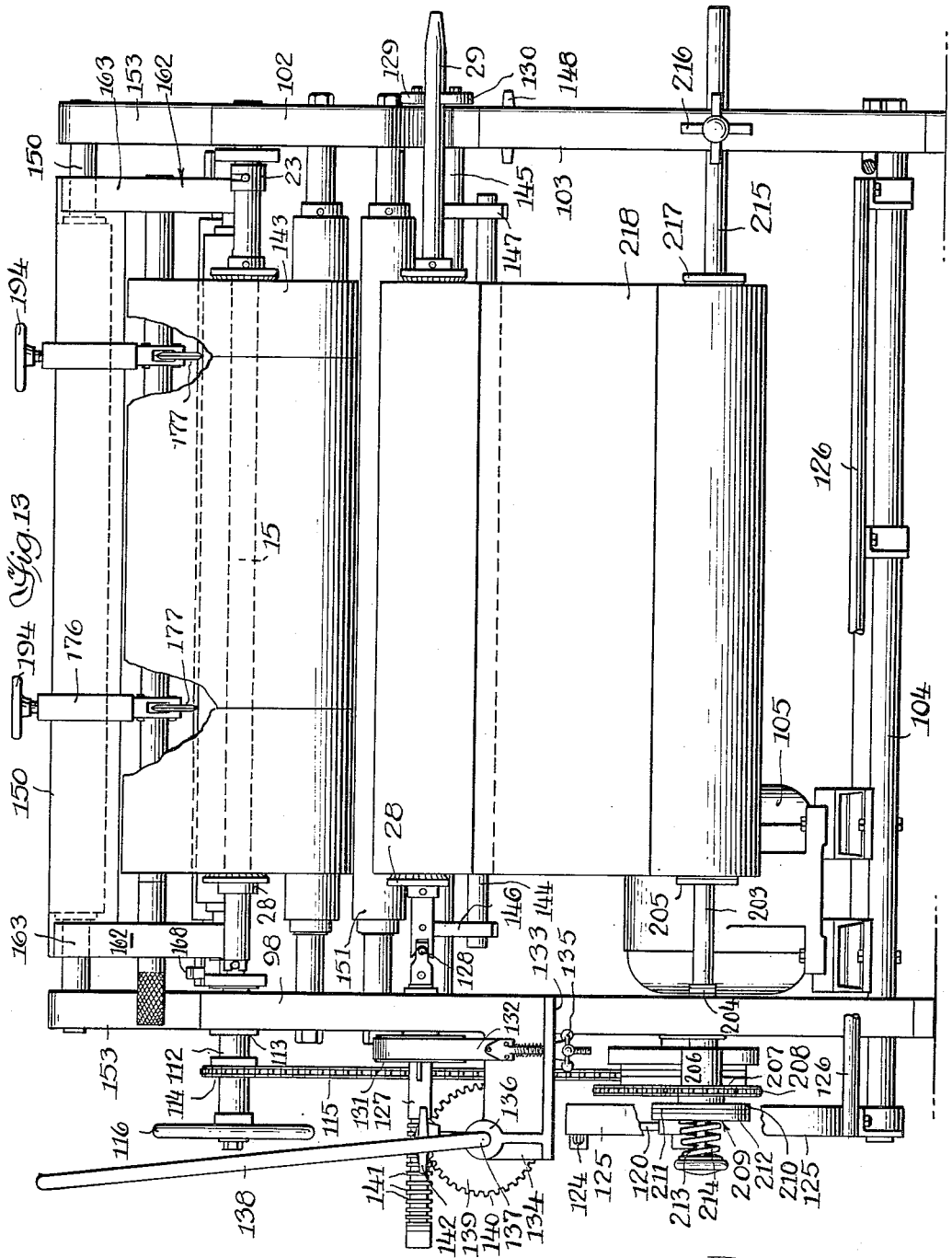

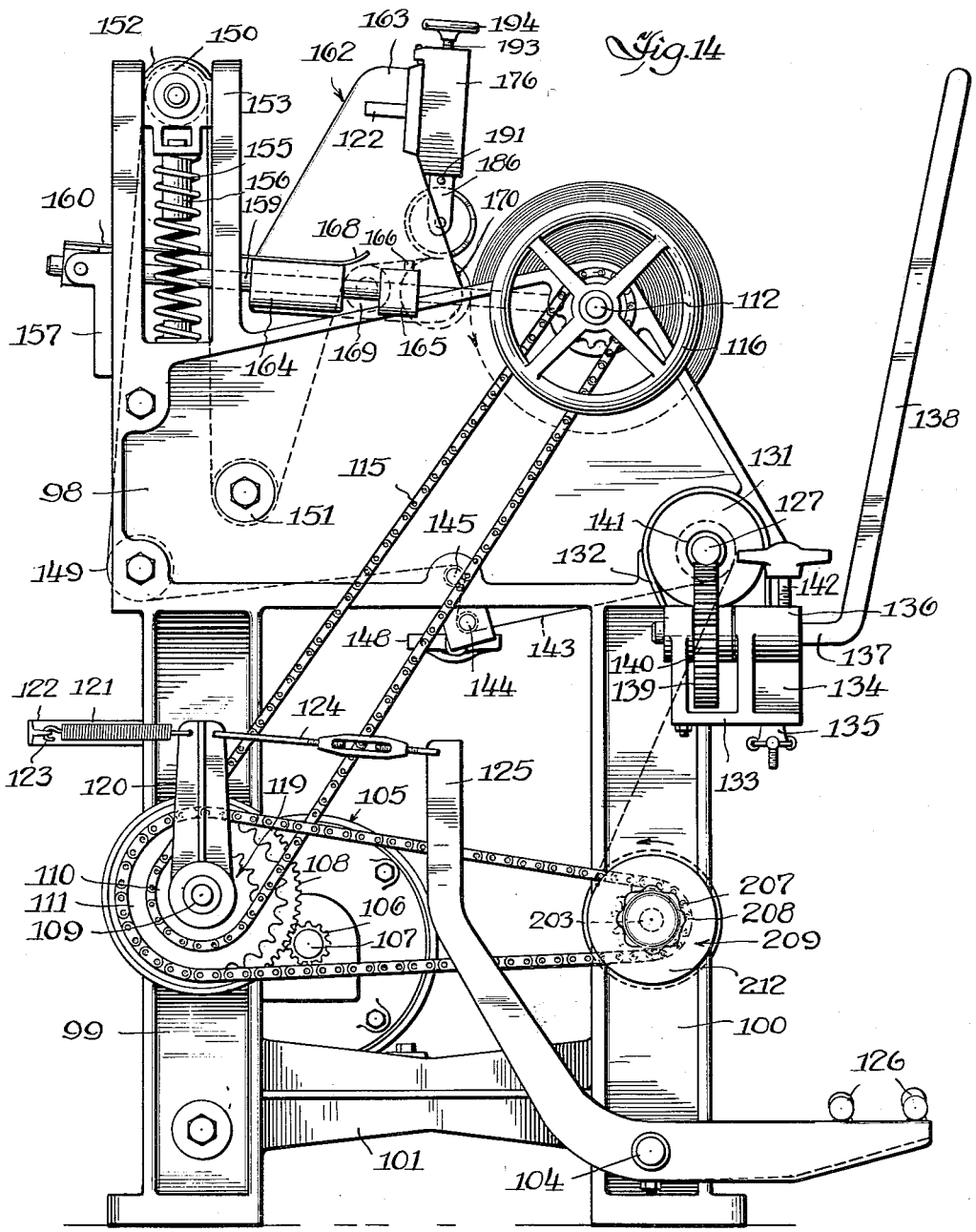

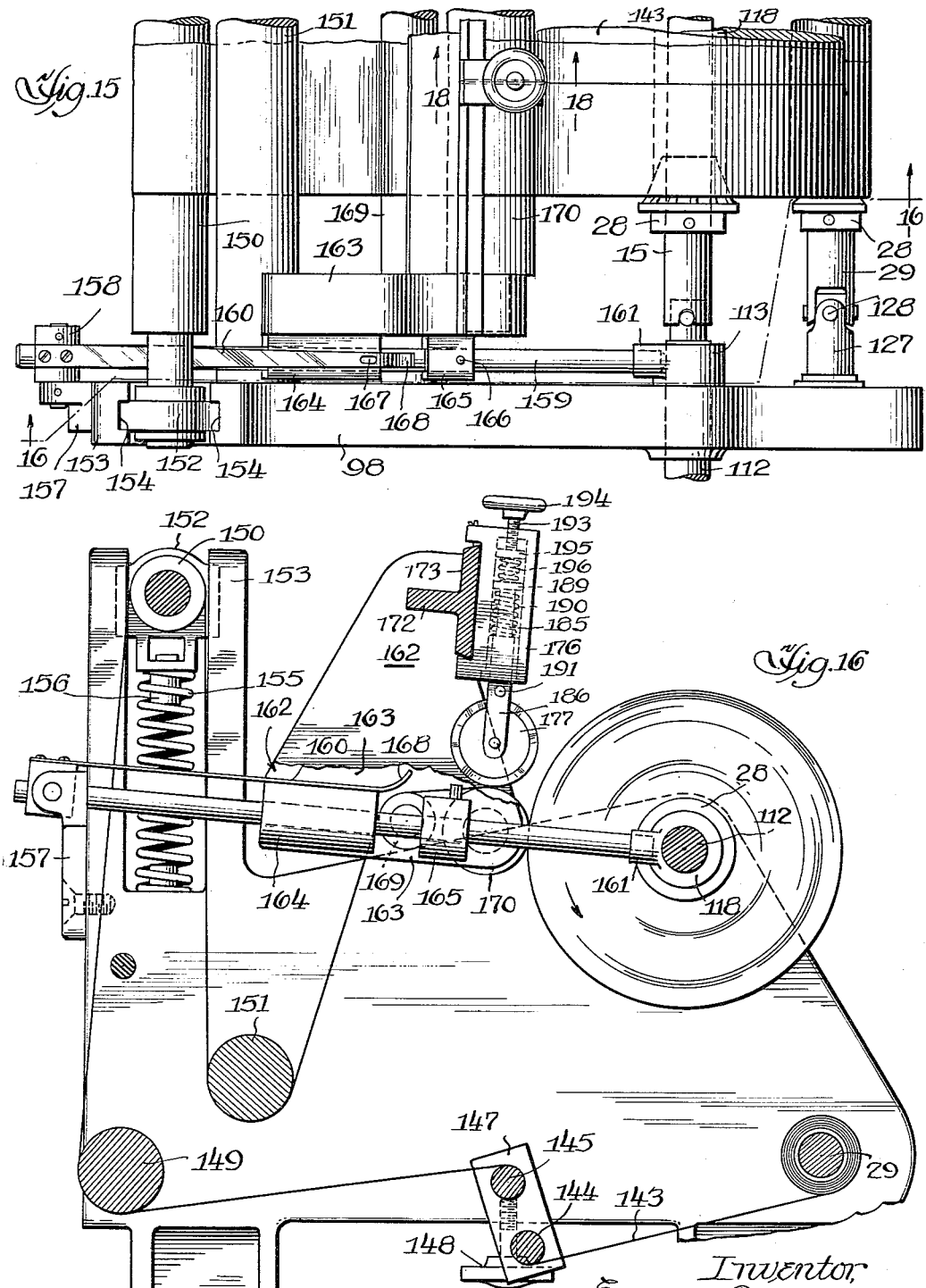

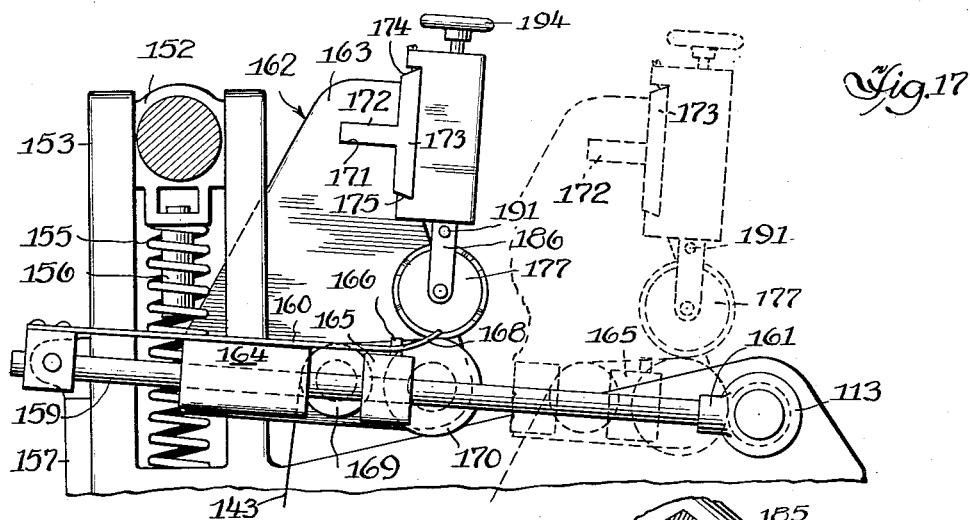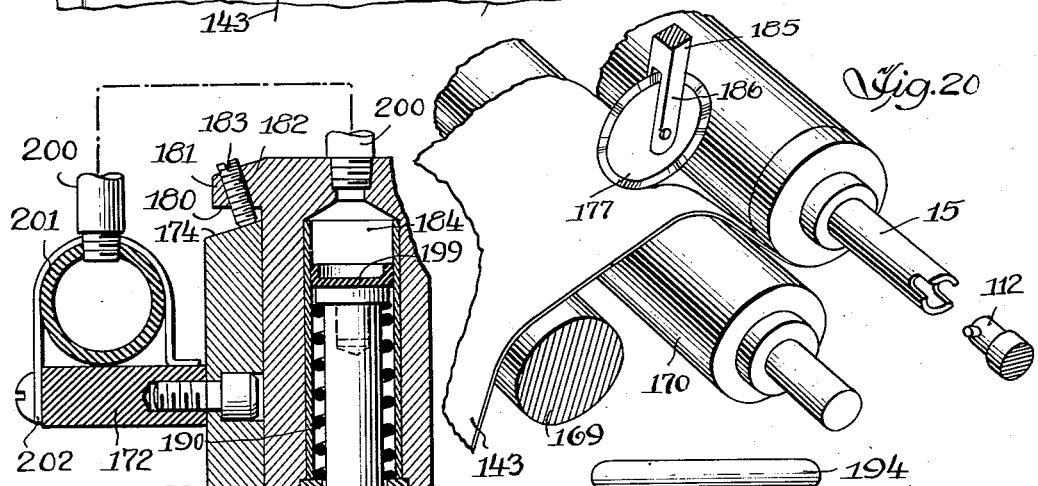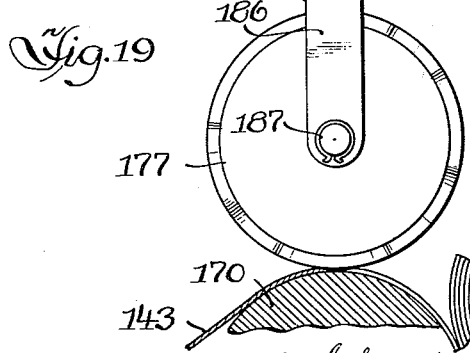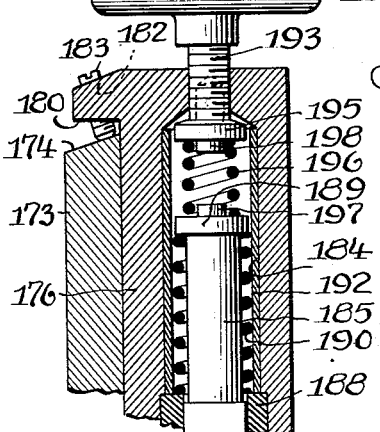

3,096,039
MACHINE FOR SLITTING SHEET MATERIAL
Eugene Doven, Appleton, Wis., assignor to The Appleton Machine Company, Appleton, Wis., a corporation of Wisconsin
Filed July 8, 1958, Ser. No. 747,163
2 Claims. (Cl. 242—56.2)

This invention relates to a machine for slitting sheet material and is particularly concerned with a machine for cutting or scoring sheet material drawn from rolls thereof and rewinding the slit sheet material into roll form.

Machines of this type include a supply shaft for holding a roll of sheet material to be slit, which shaft may be mounted on the machine or disposed on a separate stand, a rewind shaft upon which the slit sheet material is wound, a plurality of tensioning rolls and a frame for supporting a plurality of cutting or scoring members in predetermined relationship to the sheet material being fed through the machine.

The supply shaft, according to the present invention, is pivoted at one end by means of a universal joint to facilitate loading of the machine by a one-man operation. After a roll of material to be slit has been placed on the supply shaft, the shaft is swung into position and dropped into an open support which may be readily closed to hold the shaft for rotation.

Different materials are slit most efficiently at different speeds depending upon the character of the material. To facilitate this, a variable drive and friction brake are provided on the machine to permit running any sheet material through the machine at the speed at which it can be most efficiently slit.

It has been found that materials that are slit by a knife which may be in the form of a razor blade, can be slit most efficiently between two surfaces, such as rolls, between which the material is tensioned, by keeping the distance from the knife to the roll on the rewind shaft substantially constant and as short as possible and by keeping the slit material under substantially constant tension between the point where it is slit and the tangential line where it is wound upon the rewind shaft.

The roll on the rewind shaft constantly increases in diameter. In order to keep the tension on the material uniform and to maintain the short distance between the knife and tangential point where the slit material is wound on the rewind shaft substantially constant, the cutter bar assembly, on which the knives are mounted, is movably mounted to permit the knife to move from the rewind shaft as the rewind roll increases in diameter. The cutter bar assembly may be pivotally movable or it may be slidable.

The machine is also provided with a hardened roll adapted to cooperate with rotatable scoring discs mounted on the cutter bar assembly when the material being run through the machine is to be score cut. The cutter bar is removable to facilitate the use of knives such as razor blades or scoring discs. The scoring discs may cut entirely through the sheet material or they may merely score part way through it.

The structure by means of which the above noted and other advantages are attained will be described in the following specification, taken in conjunction with the accompanying drawings showing two preferred illustrative embodiments of the invention, in which:

FIGURE 1 is a front elevational view of a machine embodying the invention;

FIGURE 2 is a side elevational view of the machine shown in FIGURE 1;

FIGURE 3 is a cross-sectional view, taken along the line 3—3 of FIGURE 2;

FIGURE 4 is an enlarged cross-sectional view through the friction brake, taken along the line 4—4 of FIGURE 3;

FIGURE 5 is a fragmentary elevational view of the cutter bar with a plurality of knives mounted thereon;

FIGURE 6 is a detailed perspective view of a multiple knife mounting;

FIGURE 7 is a detailed perspective view of a single knife mounting;

FIGURE 8 is a fragmentary side elevational view showing the means for locking the free end of the supply shaft in place;

FIGURE 9 is a fragmentary cross-sectional view showing the position of the knife when the rewind roll is small;

FIGURE 10 is a view similar to FIGURE 9 showing the same mechanism after the rewind roll has increased in diameter;

FIGURE 11 is a fragmentary cross-sectional view through the bearing on the end of the rewind shaft;

FIGURE 12 is a detailed perspective view of the retaining member and bearing in position to receive the end of the rewind shaft;

FIGURE 13 is a front elevational view of a machine constituting another embodiment of the invention;

FIGURE 14 is a side elevational view of the machine shown in FIGURE 13;

FIGURE 15 is a fragmentary top plan view of the machine shown in FIGURE 13;

FIGURE 16 is an enlarged cross-sectional view, taken along the line 16—16 of FIGURE 15;

FIGURE 17 is a fragmentary side elevational view showing the slidable mounting for the cutter bar;

FIGURE 18 is a fragmentary sectional view of the upper end of the mounting for the scoring disc taken along the line 18—18 of FIGURE 15 and showing manually adjustable means for applying pressure to the scoring disc;

FIGURE 19 is a fragmentary view, similar to FIGURE 18, showing hydraulic means for applying pressure to the scoring disc; and FIGURE 20 is a fragmentary detail perspective view of a scoring disc mounted for slitting sheet material.

Referring to FIGURES 1 to 12 of the drawing, the reference numerals 2 and 3 indicate a pair of vertical side walls tied together in spaced relation by suitable transverse rods 4 and 5 to provide a frame for the machine. A motor mounting base 6 is pivotally disposed on transverse rod 5 and a motor 7 and a reduction gear enclosed in a housing 8 are rigidly mounted on base 6. Sprockets 9 are secured to a drive shaft 10 that projects from housing 8 and are driven by motor 7 through the reduction gear. Additional sprockets 11 are mounted on a shaft 12 which is journaled in a bearing 13 mounted in side wall 2.

Sprockets 9 and 11 within each group, respectively, are all of different sizes and the sprockets of the two groups are arranged in aligned pairs. That is, the largest of the sprockets 9 is in the same vertical plane as the smallest of the sprockets 11, and the smallest of the sprockets 9 is in the same vertical plane as the largest of sprockets 11, etc. An endless chain 14 extends around one complementary pair of sprockets and may be interchangeably applied to any other pair of sprockets 9 and 11. The pivotal mounting of base 6 allows the weight of the motor to hold chain 14 taut. Base 6, with the motor and gear housing, may be lifted about the pivot 5 to provide slack in chain 14 whenever it is desired to change chain 14 from one pair of sprockets to another.

A rewind shaft 15 has a sleeve 16 projecting from one end thereof to fit over the inner end of shaft 12. A slot 17 extending longitudinally from the end of sleeve 16 is adapted to engage a pin 18 projecting laterally from shaft 12 adjacent its inner end. The interengagement of slot 17 and pin 18 causes shaft 12 to rotate rewind shaft 15. The rate of rotation of the rewind shaft may be varied by moving chain 14 from one pair of sprockets to another. The variable speed provides a distinct advantage because it is always desirable to slit the sheet material at maximum speed, and some sheet material cannot be slit as fast as others.

The other end of rewind shaft 15 is rotatably mounted in a bearing 19 in side wall 3. The top of bearing 19 is open, as indicated at 20, to provide a cradle (FIGURE 12) into which the end of rewind shaft 15 may be removably placed. An end thrust bearing 21 fits within bearing 19 and is pushed into abutting engagement with the inner vertical wall of bearing 19 to engage the end of rewind shaft 15, as shown in FIGURE 11. Thrust bearing 21 prevents accidental lateral displacement of rewind shaft 15. Bearing 21 is locked in place by a set screw 22 extending through an aperture provided therefor in side wall 3.

A sleeve 23 is rotatably mounted on bearing 19 to provide a closure for the open top 20, thereby preventing accidental vertical displacement of rewind shaft 15. Sleeve 23 has a front flange 24 adapted to abut the inner end of bearing 19. A pin 25 projects laterally from the outer surface of bearing 19 into a slot 26 extending partially around the circumference of sleeve 23 to help retain the sleeve in position on the bearing. Sleeve 23 is provided with a notch 27 adapted to register with open top 20 of bearing 19 in one position of the sleeve to permit movement of one end of rewind shaft 15 into or out of bearing 19.

Suitable core chucks 28 are applied to rewind shaft 15 before it is inserted into the bearing. The core chucks are secured in place in conventional manner. Sleeve 23 is then rotated on the bearing to provide a closure for the open top 20. Pin 25 acts as a stop member and abuts the end of slot 26 to limit the rotational movement of sleeve 23. In the closed position of sleeve 23 the edge 24' of flange 24 serves as a bearing surface for the end of rewind shaft 15 and prevents any vertical play in the shaft.

In the machine illustrated in FIGURES 1 to 12, the rewind shaft is the only driven shaft, but it will be understood that when the sheet material to be slit is originally wound with a liner that is to be separated from the slitted sheet material, another driven shaft is provided for rewinding the liner. Such a rewind shaft is shown in the second embodiment of the invention illustrated in FIGURES 13 to 20, inclusive, hereinafter described.

In the embodiment of FIGURES 1 to 12, a supply shaft 29 is secured to one end of a stub shaft 30 by a universal joint, as indicated at 31, FIGURE 4. Stub shaft 30 is rotatably mounted in a bearing 32 mounted in side wall 2. The stub shaft is provided with a friction brake 33 to provide a slight drag on the supply shaft to prevent it from overrunning the rewind shaft and thus prevent it from creating slack in the sheet material.

As shown in FIG. 4, the friction brake comprises a plate 34 spaced from side wall 2 by a spacer 35 and held against rotation relative to side wall 2 by a stud 35'. Stud 35' is threaded into an aperture 36 in side wall 2 and engages a recess 37 in one face of plate 34. Another plate 38 is keyed to stub shaft 30, as indicated at 39, to rotate with the stub shaft. A plate 40 is freely mounted on stub shaft 30 between plates 34 and 38. The outer end of stub shaft 30 is provided with a threaded counterbore 41 into which a screw 42 having an enlarged head 43 is threaded. A compression spring 44 encircling the shaft of screw 42 is biased between enlarged head 43 and the outer surface of plate 38 to apply pressure to the brake plates in accordance with the extent to which screw 42 is threaded into recess 41.

Supply shaft 29 is provided with core chucks 28 to hold a roll of sheet material 45 to be slit in position on the supply shaft. Universal joint 31 permits supply shaft 29 to be lifted with one arm while a roll of sheet material to be slit is positioned on the supply shaft with the operator's other arm, thus making the loading of the sheet material on the supply shaft a one-man operation.

The free end of supply shaft 29 is supported between two rollers 46 and 47 mounted on side wall 3 and freely rotatable. The peripheries of rollers 46 and 47 extend above the lower wall 48 of a notch 49 in side wall 3, as shown in FIGURE 8, to provide a rolling support for the end of supply shaft 29. The end of shaft 29 is pushed into notch 49 and rested on rollers 46 and 47. These rollers are so positioned that the end of shaft 29 rests on their peripheral surfaces above wall 48.

The end of shaft 29 is locked in place by a pair of rollers 50 and 51 rotatably mounted in laterally spaced relationship on a plate 52. Plate 52 has an elongated slot 53 for mounting it on a stud 54 for pivotal and sliding movement. Stud 54 projects outwardly from side wall 3 and is threaded for reception of a wing nut 55 that is tightened against plate 52 to hold the plate against movement. A handle 56 projects from the upper end of plate 52 to facilitate manual adjustment of the plate. In FIGURE 8, plate 52 is held out of the way to permit the end of shaft 29 to be seated on rollers 46 and 47. Wing nut 55 is then loosened and plate 52 is moved pivotally about stud 54 until rollers 50 and 51 are in substantial vertical alignment with rollers 46 and 47. Plate 52 is then lowered to allow the peripheral surfaces of rollers 50 and 51 to engage the end of shaft 29. Wing nut 55 may then be tightened to prevent accidental displacement of rollers 50 and 51, and thereby lock the end of shaft 29 in place.

A cutter bar assembly 57 is mounted on sleeves 58 rotatably mounted on opposite ends of transverse rod 4. The cutter bar assembly comprises a pair of side frame plates 59 and 60 apertured to fit on sleeves 58. One end of a cutter bar shaft 61 has a projecting stub 62 fitting into a recess 63 in plate 60. A screw 64 extending through an aperture in frame plate 59 has a boss 65 threaded into a counterbore 66 in the other end of cutter bar shaft 61 to hold the cutter bar shaft against lateral play. The cutter bar shaft may be removed from the frame plates when screw 64 is removed. The cutter bar shaft is rotated into the desired position, and is then locked against rotation by set screws 67 and 68 threaded into vertical bores in plates 59 and 60, respectively.

A rectangular cutter bar 69 is rigidly secured in tangential relationship to shaft 61 with its longitudinal edges 70 and 71 spaced from the peripheral surface of the shaft. Knife holders 72 and 73 are designed to fit on cutter bar 69 and are essentially the same, except that holder 72 is for a single knife, and holder 73 is adapted to hold a multiplicity of knives in laterally spaced relationship. Holder 72 comprises a body portion 74 recessed adjacent one end, as indicated at 75, FIGURE 7, and an end portion 76 secured thereto by a screw 77. Flanges 78 and 79 on body portion 74 and end portion 76, respectively, extend toward each other and fit around the longitudinal edges of cutter bar 69. Screw 77 permits holder 72 to be slid to any desired lateral position on the cutter bar, and is tightened to hold it in said position. The lower portion of body portion 74 is slotted, as indicated at 80, to receive one edge of a knife 81. The knife shown is a single edge razor blade, but any suitable knife may be used. Screw 82 regulates the depth of insertion of the knife in the holder, and screw 83 clamps the knife transversely to secure it in any desired position of longitudinal adjustment relative to the holder.

In FIGURE 6 the body portion 84 of knife holder 73 is in the form of a block having a plurality of slots 85 for holding individual knives 81. A screw 82 is positioned in each slot 85 to control the depth of insertion of each knife in its slot 85, and a screw 86 clamps the slotted end of the block transversely to hold the knives tightly in their positions of longitudinal adjustment in the slots. A pair of nuts 87 exerts clamping force against the end portion 88 to hold knife holder 73 on cutter bar 69. If desired, a screw 86 may be inserted in each side of the block adjacent the slotted end to exert pressure transversely of the slots.

Cutter bar assembly 57 also includes a pair of rolls 89 and 90 mounted on shafts 91 and 92, respectively, both of which are journaled in side frame plates 59 and 60. Shaft 91 is located above rewind shaft 15 in approximate vertical alignment therewith, and shaft 92 is located rearwardly of shaft 91.

A plurality of tensioning rolls 93, mounted on shafts 94, serve to guide the sheet material 45, which is to be slit, from the supply roll to roll 90. The number of tensioning rolls used may be varied, but it is important that the sheet material to be slit be fed over the top of roll 90. The sheet material passes from the top of roll 90 directly to the top of roll 89. As shown in FIGURE 2, the sheet material passes around roll 89 in a clockwise direction and on to the rewind roll that is rotating in a counterclockwise direction. The opposite direction of rotation of rolls 89 and rewind shaft 15 is an important feature because it enables roll 89 to rest directly on the sheet material wound on rewind shaft 15, and to move outwardly from the rewind shaft to maintain its contact with the outer face of the rewind roll as the diameter of the rewind roll increases, without imposing extra strain on the sheet material.

The lower edge of one or more knives 81 projects below the plane tangential to the top surfaces of both rolls 89 and 90, and slits sheet material 45 as it moves in its plane. As the diameter of the rewind roll increases, roll 89 moves pivotally upwardly about the tie rod 4, and moves the entire cutter bar assembly with it.

Since substantially all the weight of the cutter bar assembly is forward of pivot or tie rod 4, and since the normal tension on the strips tends to pull the roller 89 against the material wound on the rewind shaft, a counterweight 95 is provided to facilitate the pivoted movement of the cutter bar assembly. The counterweight is adjustably mounted on a rod 96 projecting rearwardly from each side of frame plates 59 and 60, and is secured thereto by a set screw 97.

In the embodiment of FIGURES 13 to 20, a vertical side wall 98 is supported on vertical standards 99 and 100 tied together near their lower ends by a horizontal bar 101. A similar vertical side wall 102 supported on vertical standards 103 is provided at the opposite side of the machine. Transverse base members 104 provide support for a motor 105 having a gear 106 on its output shaft 107. Gear 106 meshes with a gear 108 on a shaft 109 on which sprockets 110 and 111 are fixed.

A stub shaft 112 rotatably mounted in a bearing 113 in side wall 98 has a sprocket 114 mounted thereon. An endless chain 115 extends around sprockets 110 and 114 to drive stub shaft 112. A hand wheel 116 is fixed to the outer end of stub shaft 112 to permit manual rotation of the stub shaft for adjustment purposes when the machine is being set for operation. A rewind shaft 15 has one end secured to stub shaft 112 and its other end mounted in a bearing 19 in side wall 102. Rewind shaft 15 is the same in both embodiments of the machine and is mounted in the same manner. Accordingly, the description of the rewind shaft will not be repeated here. Hand wheel 116 facilitates securement of the sheet material to a core 118 mounted between core chucks 28 on rewind shaft 15.

A friction brake 119 is secured to one end of drive shaft 109 to provide a variable speed control. The friction brake comprises a brake lever 120 normally held in fully open position by a spring 121 having one end secured to a fixed bracket 122 (FIGURE 14) as indicated at 123. A link 124, secured at one end to brake lever 120, is secured at its other end to an arm 125 pivotally mounted on the foremost transverse base member 104 and is provided with a foot treadle comprised of a pair of oppositely acting, transversely extending bars which are so twisted or bent that foot pressure applied thereto will have a uniform effect independently of the point along the length of the bars whereat the pressure is applied. Vertical pressure applied against treadle 126 will slow up or stop the rotation of drive shaft 109.

The mechanism operates similarly to the hand-operated brake mechanism 33 of FIG. 4. When screw 43 of brake 33 is rotated, desired drag or freeing of the supply shaft 29 is effected to slow down or permit speed up of rotation. In the mechanism of the FIGS. 13 and 14, depressing members 126 of the treadle effects rotation of arm 125 around pivot 104. This motion draws turnbuckle 124 and the attached brake lever 120 in a clockwise direction against the bias of anchored spring 121. The braking mechanism is controlled by rotation of the lever 120. This control may be operably the same as the screw handle control 38 for the braking mechanism 33. The turnbuckle 124 provides an adjustable connection between the foot treadle and the brake control arm.

In the embodiment of FIGURES 13 to 20 the supply shaft is the same as in the previous embodiment, and is designated by the same reference numeral 29. This shaft may be loaded in the same manner as in the previous embodiment since one end is pivoted to a stub shaft 127 by a universal joint 128 similar to the universal joint 31. The other end of supply shaft 29 may be locked against accidental vertical displacement by the structure described in the previous embodiment, but I have shown a modified structure in which a single roller 129 is substituted for the pair of rollers mounted on plate 52. A pair of rollers 130 positioned below shaft 29 support it in the same manner as rollers 46 and 47.

Stub shaft 127 has a pulley 131 secured to it outwardly of side wall 98. A friction strap 132 extends around the top of pulley 131 to act as a drag to prevent the supply roll from overrunning the rewind roll and thereby creating slack in the sheet material being slit. One end of strap 132 is fixed to the bottom wall 133 of a bracket 134 extending outwardly from side wall 98. The other end of strap 132 extends through bottom wall 133 and is threaded into a nut 135 by which the friction on stub shaft 127 may be adjusted.

Bracket 134 is provided with a hub 136 in which a rod 137 is rotatably mounted. Rod 137 is bent to provide a handle 138 that may be moved manually to rotate rod 137 in hub 136. A pinion gear 139 having teeth 140 on its periphery is rigidly mounted on rod 137 and rotates therewith. Teeth 140 are meshed with teeth 141 on the outer end portion of stub shaft 127. The outer end portion of stub shaft 127 constitutes a cylindrical rack, since each tooth 141 extends circumferentially of shaft 127 in a circular line. Handle 138 may be moved pivotally to move stub shaft 127 axially and thereby adjust the lateral position of supply shaft 29. It should be noted that this lateral adjustment may be made without slowing or stopping the machine because teeth 140 remain in mesh with teeth 141 while the machine is in operation. A set screw 142 is threaded through hub 136 to engage rod 137 and hold supply shaft 29 in any desired lateral position.

As the sheet material is pulled from the supply shaft, it passes between a pair of snubbing rods 144 and 145. Rod 145 is rotatably mounted in side walls 98 and 102. Two plates 146 and 147 are rigidly secured to rod 145 adjacent the opposite ends thereof. The opposite ends of rod 144 extend through apertures in plates 146 and 147 which serve as the sole means of support for rod 144. Rod 144 may be moved relative to rod 145 by rotating rod 145 and plates 146 and 147. A thumb screw 148 is threaded through the bottom of side wall 102 to hold rod 145 against rotation after rods 144 and 145 have been adjusted in the desired angular relationship.

Sheet material 143 passes from snubbing rods 144 and 145 around tensioning rolls 149, 150 and 151. Rolls 149 and 151 are rotatably mounted between side walls 98 and 102. Roll 150 is rotatably mounted in bearings 152 that are slidable vertically between guide members 153 which project upwardly from side walls 98 and 102 and are provided with vertical grooves 154 (FIGURE 15) to receive the edges of bearings 152, as indicated in FIGURE 16. A spring 155 seated between guide members 153 urges bearings 152 upwardly to help tension the sheet material 143 passing over roll 150. A stud 156 depending from bearing 152 engages spring 155 to keep it properly aligned.

Brackets 157 rigidly secured to the rear side of each guide member 153 each has a support member 158 secured to the inner surface thereof. Each member 158 supports one end of a fixed rod 159 and a leaf spring 160 overlying the rod. The forward end of each rod 159 is held in a socket 161 projecting from bearing 113. Rods 159 are parallel and are inclined downwardly toward bearings 113 which are aligned axially with rewind shaft 15. A cutter bar assembly 162 is slidably mounted on rods 159.

The cutter bar assembly comprises a pair of side frame members 163 each of which has a pair of lugs 164 and 165 extending outwardly from its lower edge. Lugs 164 and 165 are slidably mounted on rods 159 and are provided with suitable bearings.

The inclination of rods 159 causes the cutter assembly to move downwardly and forwardly toward rewind shaft 15 by gravity. A pin 166 projects upwardly from lug 165 and is engageable with an aperture 167 in leaf spring 160 to hold the cutter bar assembly spaced from its lowermost position to facilitate securing the end of the sheet material to the rewind shaft when the machine is being set for operation, and to facilitate removing the rewind roll from the machine at the completion of the slitting and rewinding operation. The forward end of leaf spring 160 is turned up, as indicated at 168, to facilitate engagement with pin 166. The turned up end 168 also makes it easier to lift the leaf spring out of engagement with pin 166 when the cutter bar assembly is to be returned to its normal operative position.

Rolls 169 and 170 are rotatably mounted between side frame members 163. Roll 169 is a tensioning roll adapted to guide the sheet material to be slit into engagement with the peripheral surface of roll 170. Roll 170 has a hardened surface against which the sheet material is score cut, as hereinafter described. The slit sheet material passes from roll 170 to rewind shaft 15 which is adjacent thereto. During the slitting operation, the sheet material being wound on the rewind shaft engages the peripheral surface of roll 170 to push the cutter bar assembly back from the rewind shaft gradually, as the diameter of the roll and slit sheet material wound on the rewind shaft increases. In this manner the point of slitting is always maintained at a constant distance from and as close as possible to the point of winding of the slit material on the rewind roll.

The front edges of side frame plates 163 are each provided with a horizontally extending recess 171 to receive a rectangular bar 172 extending transversely of the machine. A vertically disposed bar 173 is secured to bar 172 in any suitable manner. The upper and lower longitudinal edges of bar 173 are beveled as indicated at 174 and 175, respectively. One or more support members 176 for mounting individual scoring discs 177 are secured to bar 173. The support members 176 are secured in any desired lateral relationship along bar 173.

Support member 176 is provided on its rear surface with a recess 178 of a depth commensurate with the thickness of bar 173. The lower edge of recess 178 is beveled, as indicated at 179, to fit against beveled edge 175 of bar 173. The upper edge 180 of recess 178 is spaced from beveled edge 174, and the adjacent flange portion 181 of the support member is provided with a threaded bore 182 which extends perpendicularly to beveled surface 174.

A screw 183 threaded through bore 182 engages beveled surface 174 to hold support member 176 firmly against bar 173.

Support member 176 is provided with a vertical bore 184 for receiving the upper portion of a fork 185 adapted to carry a scoring disk 177. The lower end of fork 185 is bifurcated to provide two legs 186 spaced to receive a vertically disposed scoring disc 177 therebetween. The scoring disc is rotatably mounted on a pin 187 extending transversely between legs 186. A bushing 188 is secured in the lower portion of bore 184 by a pair of transversely extending locating pins 188' which accurately position the bushing in the bore 184 and thereby accurately position the fork and the scoring disc 177 for rolling engagement with the sheet material and with scoring roll 170. The interior cross section of bushing 188 is square, but may be of any noncircular shape.

Fork 185 is slidably mounted in bore 184. The intermediate portion of fork 185 immediately above legs 186, is engaged in bushing 188, and is shaped to fit the interior of the bushing to prevent rotation of the fork. In this way scoring disc 177 is held in proper alignment with the sheet material that is slit by the disc pressing down against the hardened surface of roll 170. The upper portion of fork 185 is preferably cylindrical, and is provided with an annular collar 189 to engage one end of a spring 190 encircling the cylindrical portion of fork 185. The other end of spring 190 bears against the shoulder formed by the top surface of the bushing 188 to urge the fork upwardly in bore 184. The upward movement of fork 185 is limited by a stud 191 projecting laterally from the fork to abut the lower end of bushing 188 when the fork is in its uppermost position. A liner 192 positioned in bore 184 above bearing 188 provides a bearing surface for collar 189.

The upper end of bore 184 is of reduced diameter, and is threaded to receive a screw 193. A handle 194 of any suitable shape on the upper end of screw 193 facilitates manual rotation of the screw. The lower end of screw 193 within bore 184 has an annular collar 195 secured thereto. A spring 196 positioned between collar 195 and the upper end of fork 185 is held in place by a stud 197 projecting upwardly from the top of fork 185 and a similar stud 198 depending from the lower end of screw 193. Handle 194 is rotated manually to adjust the pressure on fork 185 which forces scoring disc 177 into engagement with the hardened surface of roll 170 to slit the sheet material as it passes between roll 170 and the cutting edges of scoring disc 177.

The embodiment of the support member shown in FIGURE 19 is essentially the same as that of FIGURES 17 and 18 except that the manually operable handle 194 is replaced by a hydraulic cylinder. A piston 199 is moved downwardly to exert pressure on scoring disc 177 by any suitable hydraulic fluid. The hydraulic fluid is fed into the upper end of bore 184 through a conduit 200 from any suitable source 201 secured to horizontal bar 172 by clamps 202.

As shown in FIGURE 13, cutter bar assembly 162 may be provided with a bar 161 for holding knives 81 in the same manner as described in the previous embodiment. If desired, cutter bar assembly 162 may be pivotally mounted in the same manner as cutter bar assembly 57. Similarly, cutter bar assembly 57 may be slidably mounted on rods 159.

When the sheet material to be slit has a liner interleaved between the convolutions of the supply roll, it is generally desirable to separate the liner from the sheet material before it is slit, and to wind the liner on a separate shaft as the slit sheet material is being wound on rewind shaft 15. Suitable structure for such operation in shown in FIGURES 13 and 14.

A stub shaft 203 is rotatably mounted in a bearing 204 supported by standard 99. A core chuck 205 is secured in any desired lateral position on shaft 203. A sleeve 206 fitting loosely over shaft 203 has a sprocket 207 rigidly mounted thereon. An endless chain 208 extends around sprockets 111 and 207 to drive sleeve 206. Sleeve 206 drives shaft 203 through a friction brake 209. Brake 209 comprises a plate 210 fixed to sleeve 206, a plate 212 fixed to shaft 203, and a slip plate 211 interposed between plates 210 and 212. A screw 213 threaded into the end of shaft 203 has a spring 214 biased between its head and the end of the shaft to exert pressure against the brake plates.

A stub shaft 215, in axial alignment with stub shaft 203 extends through standard 103 and is held in place by a set screw 216. A core chuck 217 is rotatably mounted on the inner end of stub shaft 215 and co-operates with core chuck 205 to support a core (not shown) upon which the liner is wound as it is unwound from supply roll 143. Set screw 216 permits lateral adjustment of stub shaft 215 to provide any desired lateral spacing between core chucks 205 and 217. Brake 209 permits a slight adjustment in the rotational speed of shaft 203 by regulation of spring 214 to insure proper winding of liner 218 without interfering with the unwinding of the sheet material from the supply roll.

Although preferred embodiments of the invention have been described in detail, it will be understood that the description thereof is intended to be illustrative, rather than limiting, as many details of the structure may be modified without departing from the spirit or scope of the invention. Further it should be understood that many of the parts and features of each embodiment may be used with other embodiments and that an embodiment of the invention may include all of the features herein described.

I claim:
1. In a machine for slitting sheet material including a frame, a supply shaft for holding a roll of sheet material to be slit, a rewind shaft upon which the slit material is wound and a slitting device to slit the material in its path from said supply shaft to said rewind shaft; means disposed substantially at the ends of said rewind shaft to removably connect said rewind shaft to said frame, wherein one end of said shaft has a pin and mating groove, first removable connection with said frame and the other end of said rewind shaft has a second removable connection, said second removable connection comprising a bearing and a sleeve to rotatably enclose said other end of said rewind shaft enclosed in said bearing, said bearing and said sleeve having open groove portions which when aligned enable removal of said rewind shaft, means to selectively align and disalign said sleeve and bearing grooves, end thrust bearing means disposed within said bearing in engaging relationship with said rewind shaft other end, said sleeve having a front flange to abut the inner end of said bearing and a notch which is in registry to permit movement of the other end of said rewind shaft into and out of said bearing when said bearing and sleeve grooves are also in registry.

2. In a machine for slitting sheet material including a frame, a supply shaft for holding a roll of sheet material to be slit, a rewind shaft upon which the slit material is wound and a slitting device to slit the material in its path from said supply shaft to said rewind shaft, universal joint means disposed at one end of said supply shaft to enable angular rotation of said supply shaft from said frame at the universal joint, removable means disposed at said supply shaft other end comprising a first pair of supply shaft supporting under rollers fixedly mounted to said frame, a second pair of over rollers, a bracket having a slot, said second pair of over rollers being mounted on said bracket, a screw disposed in said bracket, slot in cooperating engagement therewith to lock said upper roller selectively in a first supply shaft retaining position and in a second position swing away from said supply shaft retaining position, said frame having an edge which is grooved, the groove being disposed to enable placement therein and removal therefrom of said supply shaft when said upper rollers are in their second position, said bracket and said rollers being disposed on opposite edges bounding said frame groove.

References Cited in the file of this patent
UNITED STATES PATENTS

| | | |
|---|---|---|
| 441,476 | Ford | Nov. 25, 1890 |
| 1,033,906 | Kennedy | July 30, 1912 |
| 2,199,648 | Parkhurst | May 7, 1940 |
| 2,310,153 | Rosenfarb | Feb. 2, 1943 |
| 2,526,029 | Judelson | Oct. 17, 1950 |
| 2,593,154 | Judelson | Apr. 15, 1952 |
| 2,635,824 | Schneider | Apr. 21, 1953 |
| 2,668,023 | Whitson et al. | Feb. 2, 1954 |
| 2,718,362 | Piperoux et al. | Sept. 20, 1955 |
| 2,790,497 | Heygel et al. | Apr. 30, 1957 |

FOREIGN PATENTS

| | | |
|---|---|---|
| 13,196 | Great Britain | of 1895 |
| 128,548 | Germany | Mar. 7, 1902 |
| 400,511 | Great Britain | Oct. 26, 1933 |